UNITED STATES PATENT OFFICE.

MICHAEL KUNZ, OF OBERHAUSEN-AUGSBURG, GERMANY.

COMPOSITION FOR POLISHING WOOD.

SPECIFICATION forming part of Letters Patent No. 302,743, dated July 29, 1884.

Application filed April 29, 1884. (Specimens.) Patented in Germany June 24, 1883, No. 26,424; in Belgium February 4, 1884, No. 46,881; in France February 13, 1884, No. 147,808, and in Austria-Hungary March 3, 1884.

*To all whom it may concern:*

Be it known that I, MICHAEL KUNZ, of Oberhausen-Augsburg, in the Empire of Germany, have invented certain new and useful Improvements in Wood-Polishing Compositions, (for which Letters Patent have been granted to me heretofore by the following governments: Germany, No. 26,424, dated June 24, 1883; France, No. 147,808, dated February 13, 1884; Belgium, No. 46,881, dated February 4, 1884, and Austria-Hungary, not numbered, dated March 3, 1884,) of which the following is a specification.

Articles of wood were heretofore polished with linseed-oil, which had the disadvantage that it entered the pores of the wood, and was liable to appear again on the surface by sweating, whereby the surface became rough and dull.

The object of this invention is to furnish a polishing-composition by which the use of linseed-oil is dispensed with, and by which the disadvantages arising from the use of the same are obviated.

The invention consists of an extract of milk-thistles in petroleum and olive-oil, prepared in the following manner and proportions: Five parts of milk-thistles, (*Carduus marianus* or *Silybum marianum*,) euphorbias, (*Euphorbia cyparissias*,) or other plants containing an acrid milky juice, are boiled with five parts of petroleum for a sufficient length of time—say half an hour or so—until the milky juice is fully extracted from said plants, after which one part of olive-oil is added to the extract. The solution is then strained off and placed in bottles ready for use.

The milky juice contained in the plants described promotes the drying and evaporating of the composition, so that sweating is entirely avoided.

Having thus described my invention, I claim as new and desire to secure by Letters Patent—

A wood-polishing composition composed of an extract of milk-thistles in petroleum, and olive-oil added thereto, substantially as specified.

In testimony that I claim the foregoing as my invention I have signed my name in presence of two subscribing witnesses.

MICHAEL KUNZ.

Witnesses:
RUDOLPH REHM,
ROBERT FURST.